United States Patent Office 3,062,684
Patented Nov. 6, 1962

---

3,062,684
METHOD OF INHIBITING CORROSION OF IRON AND STEEL
Richard S. Treseder, Oakland, Calif., and Huib de Roos, Amsterdam, Netherlands, assignors to Shell Oil Company, a corporation of Delaware
No Drawing. Filed Aug. 25, 1958, Ser. No. 757,111
Claims priority, application Netherlands Sept. 3, 1957
6 Claims. (Cl. 117—127)

The invention relates to the inhibition, viz., prevention or reduction, of the corrosion of iron and steel, in particular the corrosion of iron and steel which comes into contact with, or is periodically in contact with water containing chloride ions. In this case iron and steel is taken as including all iron alloys. The invention is particularly important with regard to the walls of tanks in tankers.

The inhibition of corrosion in tankers is a problem which has not hitherto been satisfactorily solved. The walls of the tanks are almost continuously exposed to corrosive effects. Petroleum or petroleum products transported by these tankers may cause corrosion on account of a small quantity of water which is often present in such a cargo. Strong corrosion effects are also caused by the periodical cleaning of the tanks which, in order to save time, is usually done at sea and consequently with sea-water. For this cleaning the sea-water is often heated to 80° C. or 90° C. and then sprayed under pressure against the walls in order to remove as much rust as possible together with the oil residues. Finally, when the tank is empty the walls are affected by the humid atmosphere, especially at sea.

In view of the losses sustained by contamination of the products transported, it is more urgent to control corrosion effectively in the case of tankers than in other cases.

When treating the walls of the tanks with corrosion-inhibiting materials, known as inhibitors, great care should be exercised with respect to the choice of inhibitor. These substances frequently cause turbidity or "haze," in the oil products transported, even when present in small concentrations, as they promote the emulsification of water in the oil phase. Some inhibitors require an alkaline medium to be effective. In cases where the oil previously transported has been one containing acids such as naphthenic acid, it is difficult and costly to provide the desired pH for the effective operation of such inhibitors. Other inhibitors are soluble in oil and this is also undesirable. Moreover, it was found that the effect of many compounds known as inhibitors was too slight for the present purpose.

It has now been found that potassium ferrocyanide solutions have an outstanding corrosion-resisting property but that this property is highly dependent on the concentration. Moreover, it is very important that the potassium ferrocyanide does not dissolve in the oil phase or cause emulsification of water in the oil.

A very good corrosion-inhibiting effect may be obtained by bringing the surfaces to be protected into contact with aqueous potassium ferrocyanide solutions of 11–24% by weight; the maximum effect is in the range of from 13 to 21% by weight, optimum 17% by weight. Below 11% by weight the effect is very greatly reduced; comparative tests showed that when surfaces are treated with a 7% by weight solution of potassium ferrocyanide twice as much rust was formed as with the use of an 11% solution. There is also a marked decline in the effect when the concentration of the potassium ferrocyanide is increased to more than 24% by weight; a 30% potassium ferrocyanide solution permitted rust formation 1½ times as great as with a 24% solution.

The said percentages relate to potassium ferrocyanide without water of crystallization.

The surfaces to be protected by means of potassium ferrocyanide solutions may be treated by applying usual techniques known in the art. Fairly large surfaces, for example the walls of the tanks in tankers, may be sprayed with the solution. This treatment may be carried out at normal temperature, i.e., the ambient temperature, but if desired, also at an elevated temperature, for example 40–90° C. No other substances, e.g., various phosphates which are frequently found in inhibitor solutions, need be incorporated in the solution. Phosphates reduce the effect of the potassium ferrocyanide. The addition of surface-active compounds may be used as such compounds are conducive to a uniform distribution of the solution. These compounds may be employed in small concentrations, e.g., 0.001–1% by weight; the presence of chloride ions in the solution does not neutralize the corrosion-inhibiting effect; so that if desired, sea-water may be used for preparing the potassium ferrocyanide solution.

The following experiment is illustrative of actual operating conditions.

EXAMPLE

Steel strips containing 0.1% of carbon were treated in the following way:

1st day, 2nd day—immersed in synthetic sea-water, each time for four half-hourly intervals a day;
3rd day—sprayed once with synthetic sea-water until just wetted;
4th day—sprayed once with a $K_4Fe(CN)_6$ solution until just wetted;
17th day—immersed for one hour in kerosene in which 0.1% by volume of synthetic sea-water had emulsified;
31st day—as for 3rd day;
32nd day—as for 4th day;
45th day—as for 17th day;
59th day—end of the experiment.

The synthetic sea-water was prepared by mixing equal volumes of the following solutions 1 and 2 and by adjusting the pH to 8 by adding a solution of 0.1 N $NaHCO_3$.

Solution 1

| | Gr./ltr. |
|---|---|
| NaCl | 24.5 |
| KCl | 0.69 |
| KBr | 0.10 |
| NaF | 0.003 |
| $Na_2SO_4$ | 4.09 |
| $NaHCO_3$ | 0.20 |
| $H_3BO_3$ | 0.03 |

Solution 2

| | |
|---|---|
| $MgCl_2 \cdot 6H_2O$ | 11.10 |
| $CaCl_2$ | 1.16 |
| $SrCl_2 \cdot 6H_2O$ | 0.04 |

During the time the steel strips were not immersed, they were above the synthetic sea-water in a space in which the relative humidity was 50%. The temperature was always 23° C.

After the above treatment was complete the layer of oxide formed was removed and the reduction in the thickness of the strips determined by weighing.

The following table shows the reduction in thickness, calculated in mils per annum (1 mil=0.001 inch) with various concentrations of the potassium ferrocyanide solution.

| Concentration of potassium ferrocyanide, percent: | Rate of corrosion (reduction in thickness) mils per annum |
|---|---|
| 5 | 10.0 |
| 7 | 5.4 |
| 9 | 3.6 |
| 11 | 2.7 |
| 13 | 2.2 |
| 17 | 2.0 |
| 21 | 2.1 |
| 24 | 2.5 |
| 27 | 3.0 |
| 30 | 3.7 |

Besides the potassium ferro cyanide, sodium and ammonium ferrocyanides can be used in the same way to obtain good results.

We claim as our invention:

1. A cleaning and corrosion inhibiting process for ferruginous metal cargo compartments of a sea-going oil tanker which comprises; spraying the inner surfaces of said compartment containing residual amounts of refined petroleum products with an aqueous solution of alkali metal ferrocyanide in which said ferrocyanide present is between 11 and 24% of the weight of the solution.

2. A process as defined in claim 1 in which the aqueous alkaline metal solution employed is potassium ferrocyanide solution.

3. A process as defined in claim 1 in which the aqueous alkaline metal solution employed is ammonium-ferrocyanide solution.

4. A process as defined in claim 1 in which the aqueous alkaline metal solution employed is sodium ferrocyanide solution.

5. A cleaning and corrosion inhibiting process for a ferruginous metal cargo compartment of a sea-going oil tanker which comprises; spraying the inner surfaces of said compartment containing residual amounts of petroleum product with an aqueous solution of potassium ferrocyanide in which the potassium ferrocyanide present is between 13% and 21% of the weight of the solution.

6. A cleaning and corrosion inhibiting process as defined in claim 5 in which the aqueous solution contains sea water.

References Cited in the file of this patent
UNITED STATES PATENTS

| 2,105,672 | Sadtler | Jan. 18, 1938 |
| 2,426,317 | Menaul | Aug. 26, 1947 |
| 2,653,882 | Treseder | Sept. 29, 1953 |

OTHER REFERENCES

Hopkins: "The Scientific American Encyclopedia of Formulas," Scientific American Publishing Co., New York, N.Y., 1925, page 444 relied on.